United States Patent

Gelenius

[15] 3,636,447

[45] Jan. 18, 1972

[54] WIDE-ANGLE TWO-COIL ELECTRICAL GAUGE

[72] Inventor: Robert B. Gelenius, Davison, Mich.

[73] Assignee: General Motors Corporation, Detroit, Mich.

[22] Filed: May 6, 1970

[21] Appl. No.: 34,981

[52] U.S. Cl. .................... 324/140 R, 318/647, 318/653, 324/146
[51] Int. Cl. .......................................... G01r 7/00, G01r 1/20
[58] Field of Search ........................................... 324/140, 146

[56] References Cited

UNITED STATES PATENTS 2,057,845  10/1936  Pattee ................................... 324/146
3,327,208  6/1967  Allen .................................. 324/146 X Primary Examiner—Alfred E. Smith
Attorney—Jean L. Carpenter and Paul Fitzpatrick

[57] ABSTRACT

A wide-angle electrical gauge having two coils whose magnetic axes are at right angles. A signal source supplies a signal whose magnitude is proportional to the magnitude of the condition to be indicated. A sine generator is responsive to the output of the signal source and controls the current through one of the coils in a manner such that the magnetic field along its magnetic axis varies in an approximated sinusoidal fashion. A cosine generator is responsive to the output of the signal source and controls the current through the remaining coil in a manner so as to generate a magnetic field along its magnetic axis which is phase shifted from the magnetic field generated by the sine generator so as to take the form of an approximated cosine waveform in relationship thereto. A magnetic armature aligns itself with the resultant of the two magnetic fields whose angular position corresponds to the magnitude of the condition being measured.

3 Claims, 5 Drawing Figures

INVENTOR.
Robert B. Gelenius
BY
Paul Fitzpatrick
ATTORNEY

INVENTOR.
Robert B. Gelenius
BY
Paul Fitzpatrick
ATTORNEY

WIDE-ANGLE TWO-COIL ELECTRICAL GAUGE

This invention relates to gauges for indicating conditions at a remote point. Specifically, the invention relates to a novel indicator circuit which controls the current in two electromagnetic coils such that the resultant magnetic field is angularly displaced through a wide angle in proportion to the changing conditions to be indicated.

There are presently known a number of electromagnetic indicator circuits. In general, these circuits employ coils which are energized in response to the condition at the remote point in a manner to rotate the resultant magnetic field produced by the coils such that a magnetized armature will be aligned therewith. The magnetized armature is rotatably mounted in magnetic proximity to the coils and is attached to an indicator needle, which is angularly displaced over a calibrated dial face to indicate changes in the condition at the remote point. Indicators of this type have employed a number of electromagnetic coils in order to obtain a wide angle of movement of the indicator needle. It is to this form of indicator that this invention is directed.

If the currents through two coils having perpendicular magnetic axes are controlled such that the current waveforms therethrough trace sine and cosine functions respectively, the resultant of the magnetic fields generated by the coils will rotate through an angle of 360°. If the current waveforms are generated in response to variations in a condition at a remote point, the position of the resultant of the magnetic fields generated by the coils will be an indication of the condition at the remote point.

It is the general object of this invention to provide an electrical indicator circuit for angularly displacing an indicator needle over a wide angle in response to variations in conditions at a remote point by utilizing two coils and more specifically it is an object of this invention to provide for an electrical indicator circuit to supply current in the form of an approximated sine wave to a first coil and to supply current in the form of an approximated cosine wave to a second coil for angularly displacing an indicator needle over a wide angle in response to variations in conditions at a remote point.

These and other objects of this invention are accomplished by controlling the current through two coils which are wound to produce respective perpendicular magnetic fields when energized in a manner such that the current through the first coil is in the form of an approximated sine wave and the current through the second coil is in the form of an approximated cosine wave. A magnetic armature aligns itself with the resultant of the magnetic fields to provide nearly 360° of rotation.

The invention may be best understood by reference to the following detailed description of a preferred embodiment and the accompanying drawings, in which.

Figure 1:
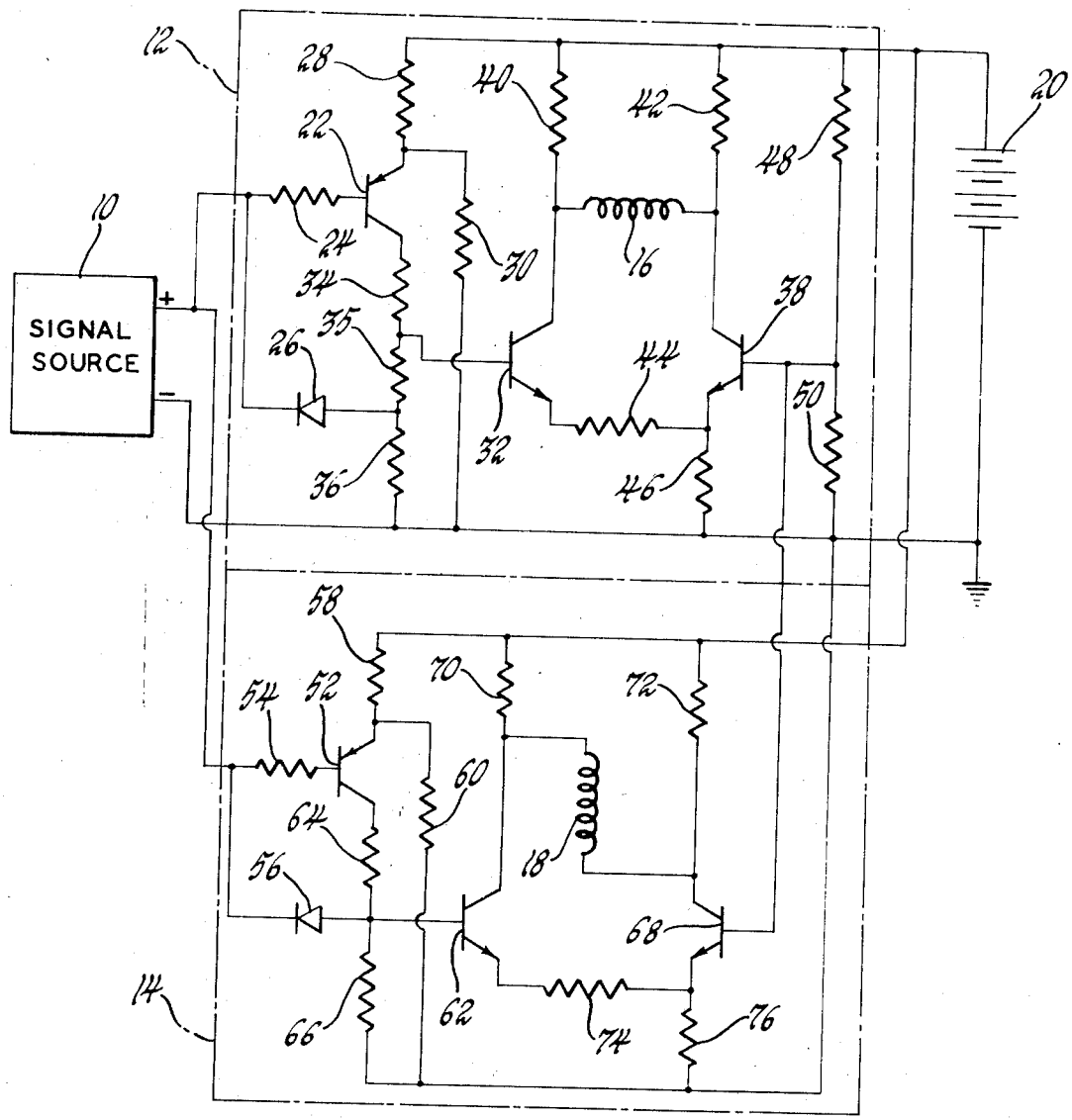
FIG. 1 is a schematic circuit diagram of a preferred embodiment of the invention.

Referring to FIG. 1, the circuit shown may be taken to represent an application of the invention to an electrical tachometer for indicating engine speed in revolutions per minute. The circuit is comprised of a signal source 10 which may be a tachometer generator capable of producing a DC voltage proportional to engine speed. The source 10 may be taken to represent any other form of signal voltage generator, the output of which is indicative of conditions at a remote point. For example, a suitable potentiometer arrangement may be employed for producing a DC voltage proportional to fuel level. The signal source 10 has the negative terminal thereof connected to ground, as shown, and the positive terminal connected to a sine generator 12 and to a cosine generator 14. The sine generator 12 controls the current through a coil 16 and the cosine generator 14 controls the current through a coil 18. A DC source 20 supplies operating power to the sine generator 12 and the cosine generator 14.

The positive terminal of the signal source 10 is connected to the base of a PNP-transistor 22 in the sine generator 12 through a resistor 24 and to the cathode of a diode 26. The emitter of the transistor 22 is connected to the positive terminal of the DC source 20 through a resistor 28 and to ground through a resistor 30. The collector of the transistor 22 is connected to the base of an NPN-transistor 32 through a resistor 34. The base of the transistor 32 is connected to the anode of the diode 26 through a resistor 35. The anode of the diode 26 is connected to ground through a resistor 36. The coil 16 is connected between the collectors of the transistor 32 to an NPN-transistor 38 which in turn are connected to the positive terminal of the DC source 20 through the resistors 40 and 42 respectively. A resistor 44 is connected between the emitters of the transistors 32 and 38. In addition, the emitter of the transistor 38 is connected to ground through a resistor 46. The base of the transistor 38 is connected to the positive terminal of the DC source 20 through a resistor 48 and to ground through a resistor 50.

The positive terminal of the signal source 10 is also connected to the base of a PNP-transistor 52 in the cosine generator 14 through a resistor 54 and the the cathode of a diode 56. The emitter of the transistor 52 is connected to the positive terminal of the DC source 20 through a resistor 58 and to ground through a resistor 60. The collector of the transistor 52 is connected to the base of an NPN-transistor 62 through a resistor 64. The base of the transistor 62 is connected to the anode of the diode 56 and to ground through a resistor 66. The coil 18 is connected between the collectors of the transistor 62 and an NPN-transistor 68 which in turn are connected to the positive terminal of the DC source 20 through the resistors 70 and 72 respectively. A resistor 74 is connected between the emitters of the transistors 62 and 68. In addition, the emitter of the transistor 68 is connected to ground through a resistor 76. The base of the transistor 68 is connected to the positive terminal of the DC source 20 through the resistor 48 and to ground through the resistor 50 in the sine generator 12.

Figure 2:
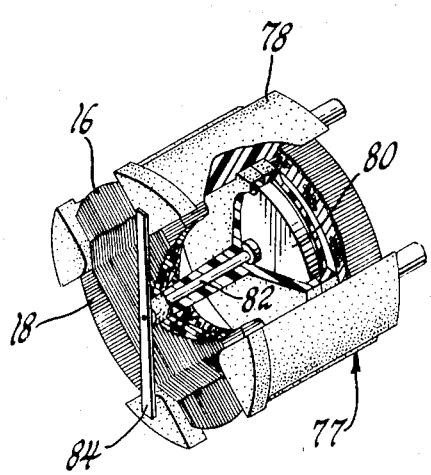
FIG. 2 is a partially broken away isometric view of a means for properly positioning the coils of the circuit of FIG. 1.

Referring to FIG. 2, there is shown an arrangement of the coils 16 and 18 in an air core gauge 77. The coils 16 and 18 are wound on a gauge body 78 and are mutually perpendicular with the axes thereof intersecting at a point in the center of the coils. Located centrally of the windings 16 and 18 is a permanent magnet armature 80 in the form of a flat round disk which is diametrically magnetized. The plane of the armature 80 lies parallel to the plane of the axes of the coils 16 and 18. Therefore, the armature 80 is within the joint influence of the fields produced by the coils 16 and 18. The armature 80 is rotatably mounted on a shaft 82 which extends to the center of the armature 80 and is perpendicular thereto. Mounted on the external end of the shaft 82 is an indicator needle 84, the angular position of which is indicative of the magnetic field relation between the coils 16 and 18.

Each of the windings 16 and 18 may produce, according to the direction and the value of current therethrough, a magnetic field in either direction along its magnetic axis. By suitably varying the direction and magnitude of the current input to each of the respective coils 16 and 18, the resultant magnetic field produced by the coils 16 and 18 may be made to vary in direction along the plane which is defined by the axes of the windings 16 and 18. The magnetic armature 80 will be aligned according to the known principle of magnetic attraction with the resultant field. Rotation of the armature 80 thus carries the indicator needle 84 through an angular displacement corresponding to the angular displacement of the resultant magnetic field.

The operation of the circuit of FIG. 1 will now be described with reference to FIG. 3 in which the waveform 86 represents the current through the coil 16 and the waveform 88 represents the current through the coil 18. When the output of the signal source 10 is zero, the transistor 22 is in saturation and the transistor 32 is biased near cutoff. The base bias of the transistor 38 as determined by the resistors 48 and 50 causes the transistor 38 to conduct. A resulting current flows through the resistor 40, the coil 16 and the transistor 38, which current will arbitrarily be called negative current for illustration purposes and is therefore shown as such in the waveform 86 in FIG. 3. The bias on the base electrode of the transistor 32 as determined by the potential across the resistor 35 and the forward drop of the diode 26 just exceeds the emitter potential of the transistor 38 such that the transistor 32 is just beginning to conduct. As the output of the signal source 10 increases, the potential on the base of the transistor 32 increases to increase its conductivity. The negative current through the coil 16 from the resistor 40 decreases (approaches zero) linearly with the increase in the output voltage of the signal source 10 until the output voltage reaches a value A, at which value the potential at the collector of the transistor 32 equals the potential at the collector of the transistor 38. At this time, there is no current through the coil 16. Upon a further increase in the output voltage of the signal source 10, the transistor 32 increases its conduction to cause current to flow through the coil 16 from the resistor 42, which current will arbitrarily be called positive current for illustration purposes. The positive current through the coil 16 increases linearly with an increase in the output voltage of the signal source 10 until the output voltage reaches a value B, at which value the diode 26 becomes back-biased. At this value, the bias on the base of the transistor 32 and therefore the positive current through the coil 16 remains constant until the output voltage of the signal source 10 increases to a value C, at which time the transistor 22 begins to cut off. The base bias of the transistor 32 thereafter decreases linearly with an increase in the output voltage of the signal source 10 to decrease the conduction of the transistor 32 and decrease the positive current through the coil 16 until the output voltage reaches a value D at which time the potential at the collector of the transistor 32 again equals the potential at the collector of the transistor 38 which results in no current through the coil 16. Upon a further increase in the voltage at the output of the signal source 10, the transistor 32 is further cut off with a resulting negative current through the coil 16. The negative current will increase through the coil 16 until the output voltage of the signal source 10 reaches a value E at which time the transistor 32 is cut off to cause a maximum negative current to flow through the coil 16. As seen by the waveform 86 in FIG. 3, the current through the coil 16 is a waveform which approximates a sinusoidal function.

The cosine generator 14 controls the current through the coil 18 in a similar manner as the sine generator 12 controlled the current through the coil 16 with the exception that the bias voltages on the transistors 52 and 62 are such that a phase shift is accomplished between the current through the coil 18 with reference to the coil 16.

Figure 3:
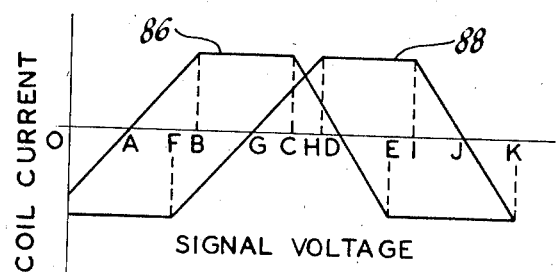
FIG. 3 is a plot of the individual coil currents against the magnitude of the condition at a remote point.

The current through the coil 18 has the following relationship to the output voltage of the signal source 10 which relationship is illustrated by the waveform 88 of FIG. 3. The current through the coil 18 is negative and constant until the output voltage of the signal source 10 reaches a value F at which time the negative current decreases (approaches zero) with an increase in the output voltage until the output voltage reaches a value G at which time there is no current through the coil 18. Thereafter, the current through the coil 18 is a positive current which increases with an increase in the output voltage of the signal source 10 until the output voltage reaches a value H after which the positive current is constant until the output voltage reaches a value I. The positive current then decreases with an increase in the output voltage of the signal source 10 until the output voltage reaches a value J at which time there is no current through the coil 18. Upon a further increase in the output voltage of the signal source 10, the current through the coil 18 is negative and increasing until the output voltage reaches a value K after which the negative current remains constant.

As can be seen from the illustrated waveforms 86 and 88, the currents through the coils 16 and 18 have an approximated sine and cosine relationship respectively.

Since the direction and magnitude of the magnetic fields generated by the coils 16 and 18 are directly proportional to the corresponding currents through the coils 16 and 18, the waveforms 86 and 88 in FIG. 3 also represent those magnetic fields.

Figure 4:
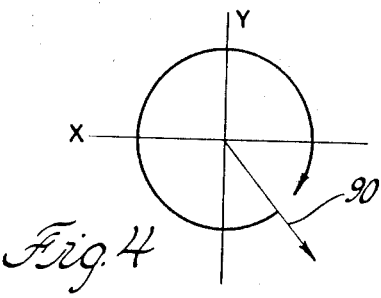
FIG. 4 is a flux field vector diagram illustrating the rotation of the resultant magnetic field vector rotation corresponding to the increase in the condition at the remote point; and, FIG. 5 is a schematic circuit diagram of another embodiment of the invention.

FIG. 4 illustrates how the vector representing the resultant of the magnetic fields produced by the coils 16 and 18 of FIG. 1 rotates with reference to the increase in the output voltage of the signal source 10. The coil 16 generates a magnetic field aligned with the axis X and the coil 18 generates a magnetic field aligned with the axis Y. When the output of the signal source 10 is zero, the resultant of the magnetic fields generated by the currents through the coils 16 and 18 is represented by the resultant vector 90 positioned as shown. When the output of the signal source 10 increases to a magnitude A, the resultant vector 90 rotates clockwise from the starting position as shown to align itself with the Y axis which corresponds to the coil 18. When the output voltage of the signal source 10 increases to a magnitude between F and B where the currents through the coils 16 and 18 are equal, the resultant vector 90 will rotate clockwise to align itself midway between the X and Y axis. When the output of the signal source 10 increases to a magnitude G, the current through the coil 18 decreases to zero and the current through the coil 16 is a maximum. The resultant vector 90 then aligns itself with the axis X corresponding to the coil 16. As can be seen, upon further increases in the output voltage of the signal source 10, the resultant vector will continue to rotate in a manner similar to that just described until it approaches the starting position shown when the output voltage reaches a value K. As can be seen as the output voltage of the signal source 10 increases from zero to K, the resultant vector 90 rotates nearly 360°.

Figure 5:
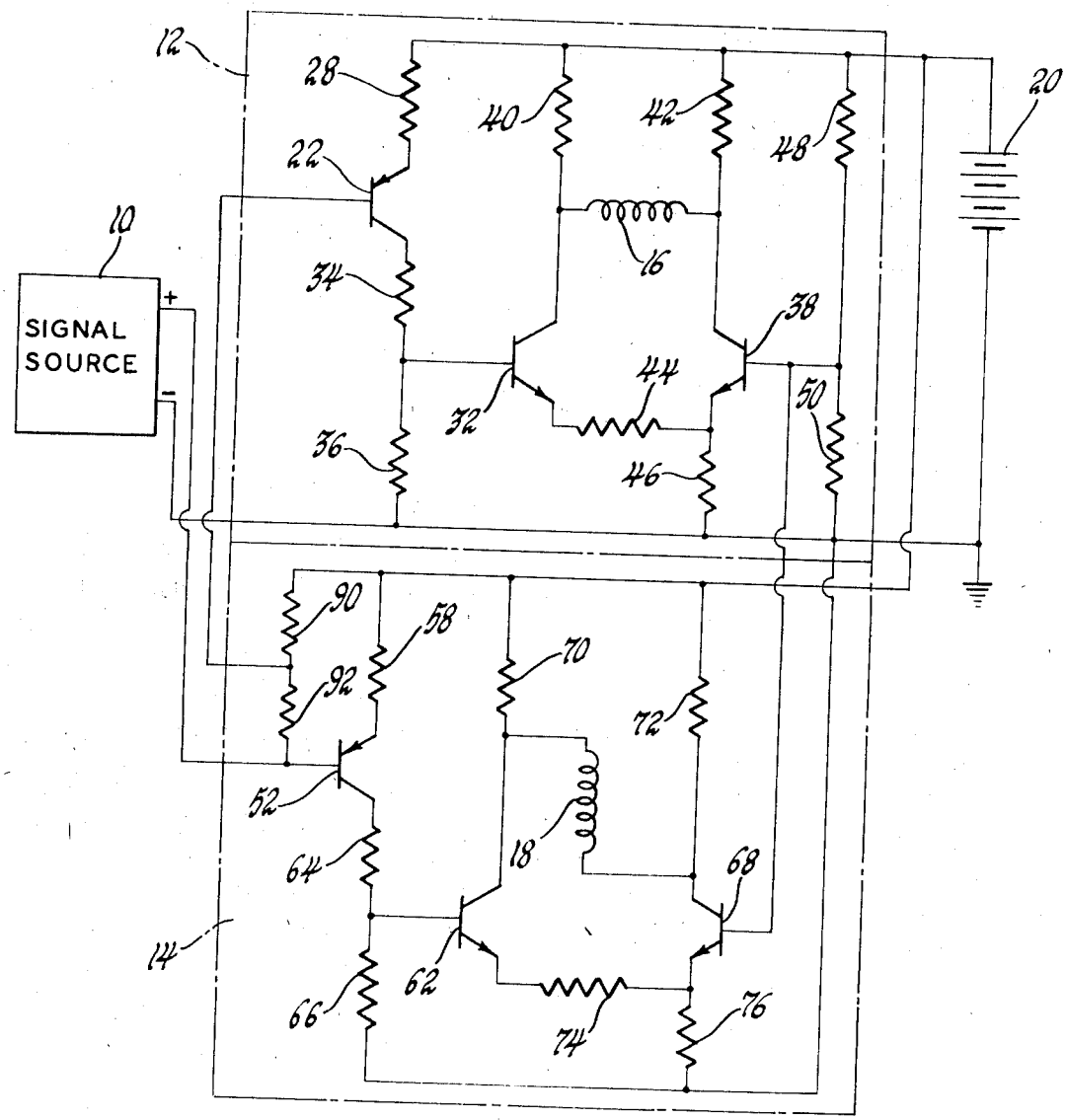

Another embodiment of the invention is shown in FIG. 5. Only that portion of the circuit is illustrated which shows the modifications to the circuit of FIG. 1. The circuit elements which are common to both circuits retain the same reference numerals.

Referring to FIG. 5, the resistors 24, 30, 35, 54 and 60 and the diodes 26 and 56 of FIG. 1 are eliminated. The positive terminal of the signal source 10 is connected directly to the base of the transistor 52. The base of the transistor 52 is connected to the positive terminal of the DC source 20 through the resistors 90 and 92 and the base of the transistor 22 is connected to the positive terminal of the DC source 20 through the resistor 90.

The operation of the circuit of FIG. 5 is as follows: When the output of the signal source 10 is zero, the potential on the base of the transistor 22 is determined by the voltage dividing network comprised of the resistors 90 and 92. This bias is of a magnitude to cause the transistor 22 to be saturated and the transistor 32 to be just at its conduction level. As the output of the signal source 10 increases, the potential at the emitter of the transistor 22 increases to increase the base bias of the transistor 32. The conductivity of the transistor 32 therefore increases with an increase in the output of the signal source 10 until it is driven into saturation. The output of the transistor 32 will thereafter remain constant until the output of the signal source 10 increases to drive the transistor 22 out of saturation after which the base bias of the transistor 32 decreases to decrease its conduction. The conduction of the transistor 32 continues to decrease with an increase in the output of the signal source 10 until it is biased into cutoff. As can be seen, the current through the coil 16 resulting from the above operation is represented by the waveform 86 in FIG. 3.

The operation of the cosine generator 14 in FIG. 5 is the same as the foregoing described operation of the sine generator 12 with the exception that the bias voltages on the transistors 52 and 62 are such that a phase shift is accomplished between the current through the coil 18 with reference to the coil 16. The resulting waveform through the coil 18 is represented by the waveform 88 in FIG. 3.

What has been described is an electrical indicator having two coils in which respective approximated sine and cosine functions are generated to drive an indicating needle through an angle which approaches 360°.

What is claimed is:

1. A system for developing a magnetic field, the angular direction of which is approximately proportional to the magnitude of an input quantity and the range of direction of which approximates 360° comprising, in combination, first and second coils in quadrature adapted to generate a common magnetic field equal to the vector sum of the magnetic fields generated individually by the first and second coils; an input circuit for supplying the input quantity to the system; first means responsive to the input quantity for delivering an output current varying approximately as a single cycle of a sine wave as the input quantity increases from a minimum to a maximum value, and second means responsive to the input quantity for delivering an output current varying approximately as a single cycle of a cosine wave as the input quantity increases from a minimum to a maximum value, the output currents being connected respectively to the first and second coils.

2. A system for rotating a shaft approximately proportionally to a quantity X where X represents the proportional increment of an input quantity which varies from a minimum to a maximum value and where the shaft has a rotation range of approximately 360° comprising, in combination, a first circuit responsive to X and having an output of approximately $\sin(k_1 X + \frac{1}{4}\Theta_\infty)$, where $k_1$ is a scale constant and $k_2$ a datum constant; a second circuit responsive to $X$ and having an output of approximately $\cos(k_1 X + k_3)$ where $k_3$ approximately equals $k_2$ or $k_2 + 180°$; a pair of coils in quadrature connected respectively to the said circuits; and a magnet mounted on the shaft so as to be self-aligning with the resultant magnetic field of the coils.

3. An electrical measuring apparatus for measuring an event at a remote point comprising, in combination, means for providing a signal related to the event to be measured; first and second coil means having respective first and second magnetic axes in quadrature; a first current control means connected to the first coil means for controlling current therethrough in a first direction; a second current control means connected to the first coil means for controlling current therethrough in a direction opposite to the first direction, wherein the first and second current control means are responsive to an increase in the signal related to the event to be measured for varying the current through the first coil means in an approximate sinusoidal manner for generating a corresponding first magnetic field along the first magnetic axis; a third current control means connected to the second coil means for controlling the current therethrough in a first direction; a fourth current control means connected to the second coil means for controlling current therethrough in an opposite direction to the first direction, wherein the third and fourth current control means are responsive to an increase in the signal related to the event to be measured for alternately varying the current through the second coil means in an approximate sinusoidal manner for generating a corresponding second magnetic field along the second magnetic axis, wherein the current through the second coil means is phase shifted from the current through the first coil means for establishing an approximated sine-cosine relationship therebetween; rotatably mounted magnetic means responsive to the first and second magnetic fields be maintained in alignment with the resultant thereof; and indicator means connected to the magnetic means for rotation therewith for indicating the magnitude of the event at the remote point.

* * * * *

UNITED STATES PATENT OFFICE
CERTIFICATE OF CORRECTION

Patent No. 3,636,447           Dated  January 18, 1972

Inventor(s)  Robert B. Gelenius

It is certified that error appears in the above-identified patent and that said Letters Patent are hereby corrected as shown below:

Column 2, line 28, "and the the" should read -- and to the --. Column 5, line 32, the equation $(k_1 X \frac{1}{4} \theta_{cc})$ should read -- $(k_1 X + k_2)$ --. Column 6, line 31, after "fields" insert -- to --.

Signed and sealed this 20th day of June 1972.

(SEAL)
Attest:

EDWARD M. FLETCHER, JR.                ROBERT GOTTSCHALK
Attesting Officer                       Commissioner of Patents